(12) United States Patent
Utriainen et al.

(10) Patent No.: US 11,142,397 B2
(45) Date of Patent: Oct. 12, 2021

(54) SYSTEM FOR AN AUTOMATED STORAGE

(71) Applicant: ACTIW OY, Naarajarvi (FI)

(72) Inventors: Otto Utriainen, Montola (FI); Jari Vartiainen, Naarajarvi (FI)

(73) Assignee: Actiw Oy, Naarajarvi (FI)

( * ) Notice: Subject to any disclaimer, the term of this patent is extended or adjusted under 35 U.S.C. 154(b) by 0 days.

(21) Appl. No.: 16/468,418

(22) PCT Filed: Jan. 26, 2018

(86) PCT No.: PCT/FI2018/050066
§ 371 (c)(1),
(2) Date: Jun. 11, 2019

(87) PCT Pub. No.: WO2018/138413
PCT Pub. Date: Aug. 2, 2018

(65) Prior Publication Data
US 2019/0352093 A1    Nov. 21, 2019

(30) Foreign Application Priority Data

Jan. 27, 2017   (FI) ..................................... 20175075

(51) Int. Cl.
*B65G 1/04*       (2006.01)
*B65G 1/06*       (2006.01)
*B65G 1/02*       (2006.01)

(52) U.S. Cl.
CPC ......... *B65G 1/0414* (2013.01); *B65G 1/0492* (2013.01); *B65G 1/065* (2013.01); *B65G 1/026* (2013.01)

(58) Field of Classification Search
CPC ..... B65G 1/0414; B65G 1/0492; B65G 1/065
See application file for complete search history.

(56) References Cited

U.S. PATENT DOCUMENTS 9,334,114 B2 * 5/2016 Salichs .................. B65G 1/065
9,701,473 B2 * 7/2017 Warries ................ B65G 1/0492
(Continued)

FOREIGN PATENT DOCUMENTS

| CN | 102822073 | 12/2012 |
| CN | 203294644 | 11/2013 |

(Continued)

OTHER PUBLICATIONS

Supplementary European Search Report in corresponding European patent application No. 18744470.8 dated Nov. 6, 2020.
(Continued)

*Primary Examiner* — James Keenan
(74) *Attorney, Agent, or Firm* — Fildes & Outland, P.C.

(57) ABSTRACT

A system for an automated storage includes store blocks, in each of which store blocks there is at least one transverse aisle extending through the store block. In addition, in a store block there are several store aisles diverging from the transverse aisle. The system includes, in each store block, at least one parent car arranged to operate in the transverse aisle of the store block. In addition, the system includes one or more transfer cars arranged to operate across the store blocks on the store aisles arranged end-to-end in the parallel store blocks. The system further includes at least one shuttle arranged to operate in the store aisles.

11 Claims, 2 Drawing Sheets

(56) References Cited

U.S. PATENT DOCUMENTS

| | | | |
|---|---|---|---|
| 9,764,899 B2* | 9/2017 | Van Den Berk | B65G 1/0492 |
| 10,173,837 B2* | 1/2019 | Lindblom | B65G 1/0414 |
| 2014/0072391 A1* | 3/2014 | Del Popolo | B65G 1/0492 |
| | | | 414/267 |
| 2014/0277689 A1 | 9/2014 | Salichs | |
| 2018/0086558 A1* | 3/2018 | Bergendorff | B65G 1/0414 |
| 2018/0222676 A1* | 8/2018 | Lindblom | B65G 1/0414 |

FOREIGN PATENT DOCUMENTS

| | | | | |
|---|---|---|---|---|
| CN | 203714555 | | 7/2014 | |
| EP | 2949604 A1 * | 12/2015 | | B65G 1/0485 |
| EP | 2995579 A1 * | 3/2016 | | B65G 1/0492 |
| GB | 1346027 A * | 2/1974 | | B65G 1/0414 |
| WO | WO-2011089063 A1 * | 7/2011 | | B65G 1/0414 |
| WO | WO-2016167712 A1 * | 10/2016 | | B65G 1/0414 |
| WO | WO-2016167713 A1 * | 10/2016 | | B65G 1/0414 |

OTHER PUBLICATIONS

Chinese Search Report and Office Action in corresponding Chinese Application No. 201880008207.X dated Jun. 29, 2020 and English language translations.
English language abstract of CN 102822073.
English language abstract of CN 203294644.
English language abstract of CN 203714555.

* cited by examiner

SYSTEM FOR AN AUTOMATED STORAGE

CROSS-REFERENCE TO RELATED APPLICATIONS

This application claims benefit of priority from International Patent Application No. PCT/FI2018/050066 filed Jan. 26, 2018, which claims benefit of priority from Finland Patent Application No. 20175075 filed Jan. 27, 2017, both of which are incorporated by reference in their entirety.

FIELD OF THE INVENTION

The invention relates to a system for an automated storage, in which automated storage there are store blocks, in each of which store blocks there is at least one transverse aisle extending through the store block, as well as several store aisles diverging from the transverse aisle, and which system includes, in each store block, at least one parent car arranged to operate in the transverse aisle of the store block and one or more transfer cars arranged to operate across the store blocks on the store aisles arranged end-to-end in the parallel store blocks.

BACKGROUND OF THE INVENTION

In order to maximize the use of the volume of a storage, dense storages are used, which are formed to be as high as possible relative to the available height. In such a storage, the store positions are next to each other and the goods being stored are generally on top of a pallet in the store position. The pallets are moved to and from the store positions by conveyors, which are generally stacker cranes and various transfer cars. The conveyors are generally connected to automated control, so that the term automated storage can be used. The storage and the control of its devices is then automatic and the whole time there is data in the system on what and in which store position something is. For example, goods are brought to the storage from production and retrieved from it to be loaded onto transportation means.

SUMMARY OF THE INVENTION

In the applicant's automated storage, stacker cranes are used between tiers of shelves. In each tier there is a transverse aisle, in which at least one parent car moves. Correspondingly, in each store aisle, where the store positions are, there is a transfer car. A transfer car is used to take a pallet brought by the parent car to the store position and correspondingly to move a pallet from the store position to the parent car. The parent car and transfer cars operate independently of each other, so that several pallets at a time can be moved within the storage. This permits efficient operation and a large handling capacity. The parent car and the transfer cars operate in their own aisles. The number, especially of transfer cars, in the store is then considerable, which increases the costs of establishing and operating a storage.

The invention is intended to create a new kind of system for an automated storage, which costs less than before, but is also more comprehensive in use. In the system according to the invention, various components are used, by means of a surprising combination of which the storage is made more efficient but nevertheless lower in cost than previously.

BRIEF DESCRIPTION OF THE DRAWINGS

In the following, the invention is described in detail with reference to the accompanying drawings showing one embodiment of the invention, in which.

DETAILED DESCRIPTION OF THE INVENTION

Figure 1:
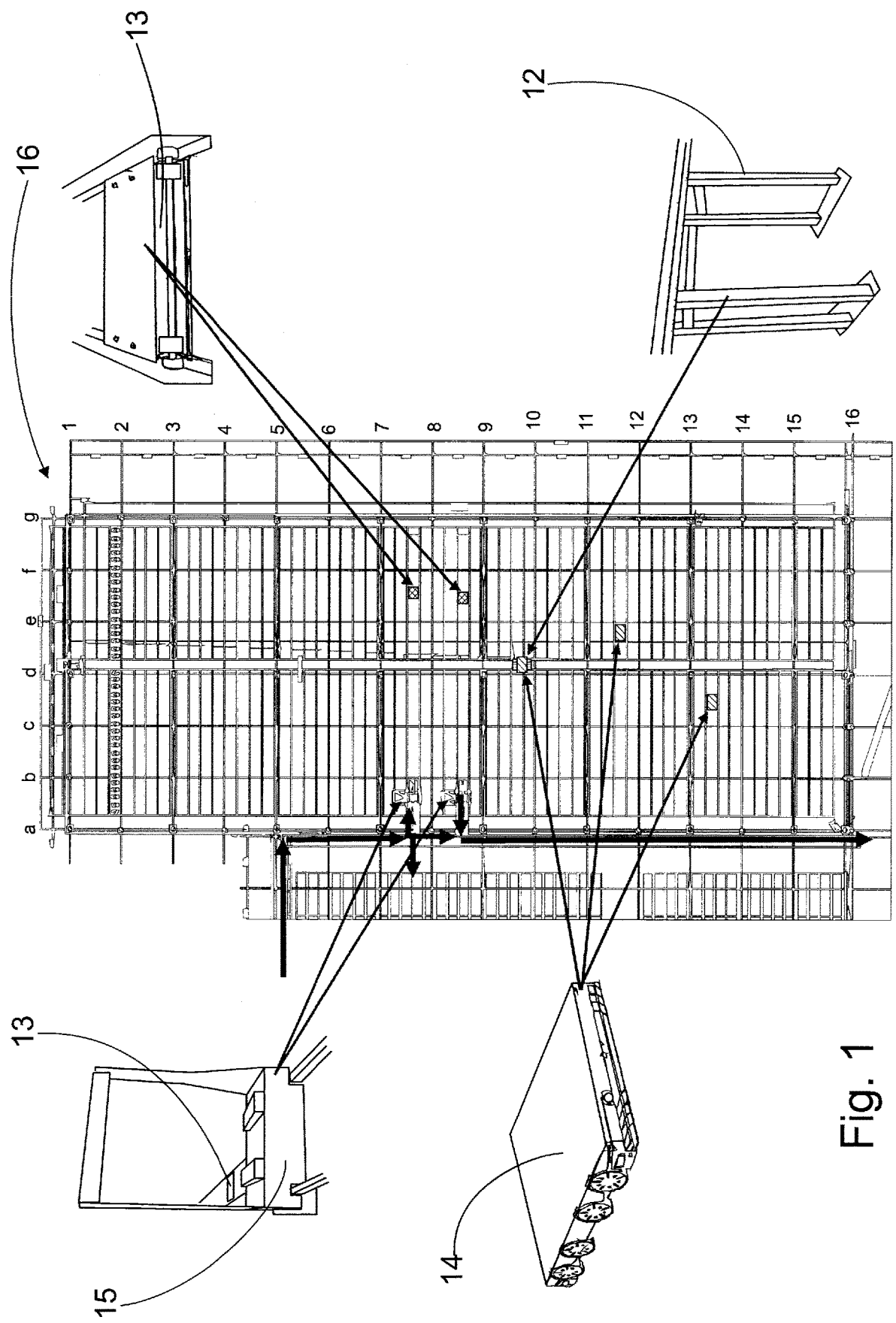
FIG. 1 shows schematically the system according to the invention, together with its components.

FIG. 1 shows schematically the system according to the invention for an automated storage. Generally there are store blocks in the automated storage. FIG. 1 shows a top view of one store block. A set of co-ordinates, which is formed of vertical columns a-g and horizontal rows 1-16, is also attached to FIG. 1. In the shelves, there are several store blocks one on top of the other. In each store block, there is at least one transverse aisle 10 and several store aisles 11. In FIG. 1, there is one transverse aisle 10 and several tens of store aisles on each side of the transverse aisle. The system includes at least one (rectangle with vertical lines) parent car 12 arranged to operate in the transverse aisle 10 as well as one or more (rectangle with double slanting lines) transfer cars 13 arranged to operate in the store aisles 11. The system according to the invention further includes at least one (rectangle with slanting lines) shuttle 14 arranged to operate in the store aisles 11. Thanks to the shuttle, a significant number of store aisles can be left without transfer cars. In practice, a shuttle can move pallets like a transfer car, but a shuttle can operate in any store aisle whatever. This makes the operation and control of the storage more comprehensive.

More specifically, there are store blocks 16 in the automated storage, in each of which store blocks 16 there is at least one transverse aisle 10 extending through the store block 16. The transverse aisle extends through the store block, in practice from one edge to the other of the store block. In addition, there are several store aisles 11 in the store block, which diverge from the transverse aisle 10. Further, the system includes in each store block 16 at least one parent car 12, arranged to operate in the transverse aisle 10 of the store block 16. The system also includes one or more transfer cars 13 arranged to operate across the store blocks 16 in the store aisles 11 arranged end-to-end in the parallel store blocks 16. In practice, the end-to-end store aisles of the store blocks form an express track 11' or aisle free of store operations, the basic structure of which corresponds to any store aisle whatever. The transfer car operates on this express track, offering a rapid transfer route between store blocks, preferably from side to side of the storage. In addition, by means of the transfer car 13 according to FIG. 2, goods are both brought to the storage and taken from the storage.

In addition, the shuttle 14 is arranged to move in the transverse aisle 10 transported by the parent car 12. In FIG. 1, a shuttle 14 is also with the parent car 12 and in practice there is also a pallet together with goods on top of the shuttle (not shown). At a specified point in the store aisle the shuttle separates from the parent car and takes the pallet to the store position in the store aisle. In between, the parent car can carry out other operations, such as transfer a pallet brought by the transfer car 13 to a stacker crane 15 or retrieve a pallet from the stacker crane 15 to be taken to some other transfer car or shuttle. In the stacker crane there is generally a cage raised by a geared motor, by which pallets and the shuttle too are transferred from one layer of the shelves to another. The pallet together with goods is brought to the stacker crane by a telescopic fork, a conveyor, or a shuttle. In the figures, thick arrows are used to show incoming and outgoing flows of goods to and from the storage. The two-headed arrows show the movements of the parent car, the transfer car, and the shuttle. In FIG. 1, a transfer car 13 arriving at a crane 15 can be seen far on the track.

A shuttle is self-powered. In addition, it has wireless data transfer. It can then operate independently in different parts of a store block. In addition, a shuttle can operate in other blocks and even on different tiers of the shelves. For long transfers, a shuttle is carried by a parent car, but transfers of pallets to a store position are made by the shuttle itself. In other words, in practice the shuttle makes the transfers of pallets on the store aisle, i.e. takes them to a store position and retrieves them from it. There is no fixed power input in the shuttle, instead the necessary power is stored in a battery or capacitor. The shuttle is charged either in the parent car (capacitor) or at a separate charging point (battery). If there is a capacitor in the shuttle, power input can be arranged to the parent car. The shuttle's capacitor then charges as the parent car moves the shuttle. In this way, separate charging points are avoided and the shuttle is available once it has charged when carried by the parent car. In both the transverse aisles and the store aisles there are tracks, on which the parent car, the transfer car, and the shuttle can move. The track also permits a pallet to be left in the store aisle.

In the system, the parent car is mechanical and its transfer devices are outside the store block. In itself, the parent car has a simple and low construction compared to electrified parent cars. In addition, the parent car can be operated without interruption. FIG. 1 shows a suspended parent car, the path of movement, of which in the transverse aisle is at right-angles relative to the store aisle. There is typically one parent car in each transverse aisle, but there can, however, be several parent cars in the same transverse aisle. In practice, a parent car can go into neither a store aisle nor the transverse aisle of another store block. A parent car can travel on a track or also be suspended. A transfer car too is mechanical and the movement devices of a transfer car are also outside the store block. Both cars use, for example, cable or toothed-belt drive, which is operated by motors connected to mains electricity. In practice, the motor, more generally the operating device, is outside the store block, i.e. the storage, and the power of the operating device is transmitted to the car by some power-transmission element, such as a cable. The operating device can vary in different applications. For example, a transfer car generally needs two motor, one for running and another for lifting the cover. The motors outside the store block do not, however, take up space in the storage and can be easily services and protected from conditions. At the same time the car's construction remains simple. The transfer car's task is to perform particularly transfers of pallets, which requires a continuous flow, volume, and/or speed. The store aisle in question can also be used as a buffer store, so that the related transfer devices can operate as efficiently as possible.

Both the parent car and the transfer car are speedy compared to the shuttle and are continuously available. The parent car and transfer car move at a speed of up to 3-5 m/s, whereas the shuttle's speed remains less than 1 m/s. This increases the store's capacity significantly. At the same time, however, thanks to the shuttles a considerable number of transfer cars can be omitted, which lowers the store's acquisition and operating costs. The transfer cars are generally arranged in the store aisles, in which a significant amount of capacity is required. In the parent car, the transfer car, and the shuttle there are lifting and transfer means for transferring a pallet from one device to another, as well as from the device to the store position and from the store position to the device. The parent car is able to move a shuttle, a pallet, and simultaneously both a shuttle and a pallet. In addition, the parent car is able to receive pallets from a transfer car and deliver pallets to a transfer car. The number of shuttles varies in different stores. The system includes at least one shuttle. More generally, the system includes 1-10, preferably 3-5 shuttles to one parent car. The shuttles, being slower than the parent car, then have time to operate and at the same time the capacity of the parent car can be efficiently utilized.

Figure 2:
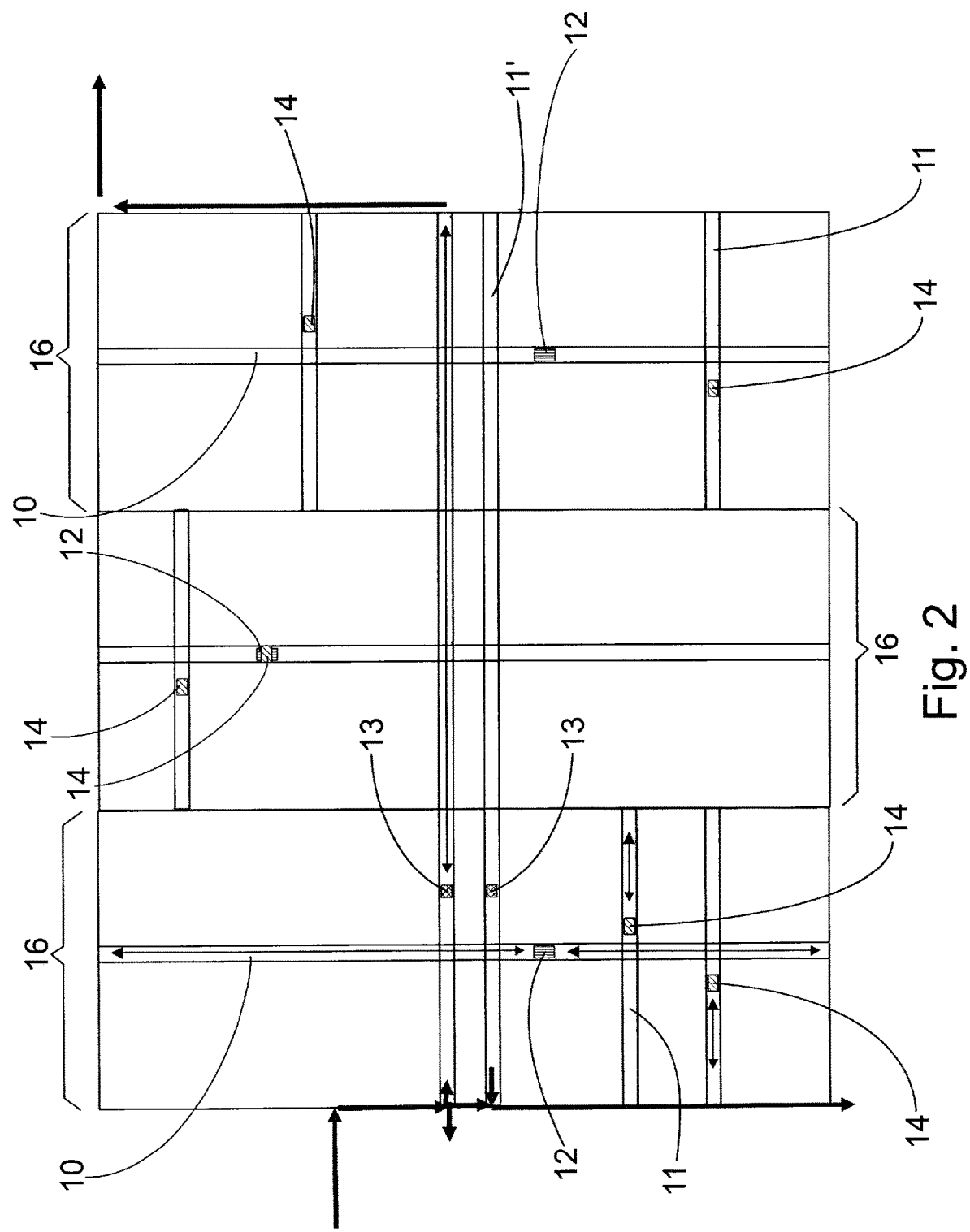
FIG. 2 shows an example of an application of the system according to the invention.

In FIG. 2, the automated storage includes several, more specifically three, parallel store blocks 16, which have transfer cars 13 in common. Even long moves can then be made in the storage rapidly and efficiently. At the same time, the material flows can be controlled more flexibly than before and the number of conveyors outside the store can be minimized. Normally, there would only be a material flow on the left-hand edge of the storage, but now be means of a long move of a transfer car 13 goods can be taken out, for example, from the upper right-hand corner. FIG. 2 shows only the store aisles 11, in which there is a shuttle or transfer car at the moment in question. The parent car 12 moves in the transverse aisle 10. In practice, the parent car moves a shuttle between the various store aisles and the shuttle moves pallets from the parent car to the store position on the store aisle. In practice, the store aisle is formed by the track on which the transfer cars and shuttle can move. Once the pallet in question has been ordered, the shuttle retrieves the pallet from the store position to the parent car. More generally, the shuttle is arranged to operate with the parent car. The transfer car performs moves between the parallel store blocks and both brings pallets to the storage and takes pallets out of the storage. The transfer car operates on an express track formed of end-to-end store aisles, or in an aisle in which goods are not stored. By means of the joint operation of parent cars, transfer cars, and shuttles the structure of the system is kept simple and the number of transfer cars is reduced, but at the same time the operation of the system is made more efficient and its control is made more comprehensive.

The invention claimed is:

1. System for an automated storage of pallets, in which automated storage there are parallel store blocks disposed side-by-side and directly attached to each other, in each of which store blocks there is at least one transverse aisle extending through the store block, as well as several store aisles diverging from the at least one transverse aisle, and which system includes, in each store block, at least one parent car arranged to operate in the at least one transverse aisle of the store block, and at least one shuttle arranged to operate in the store aisles, characterized in that the system further includes at least one transfer car arranged to operate horizontally across the parallel store blocks on an express track formed of all of the store aisles in one entire row across all the parallel store blocks, the row of store aisles forming the express track being arranged end-to-end continuously through the parallel store blocks, and the at least one shuttle is arranged to independently operate with any of said at least one parent car in any of said store aisles.

2. System according to claim 1, characterized in that, in addition to the store aisles, the at least one shuttle is arranged to operate in the at least one transverse aisle.

3. System according to claim 1, characterized in that the at least one shuttle is arranged to operate in the at least one transverse aisle when transported by the at least one parent car.

4. System according to claim 1, characterized in that the at least one shuttle is self-powered.

5. System according to claim 4, characterized in that the at least one shuttle includes a capacitor, for the charging of which an electrical input is arranged in the at least one parent car.

6. System according to claim 4, characterized in that the at least one shuttle includes a battery, for the charging of which a charging point is arranged in the store blocks.

7. System according to claim 3, characterized in that the at least one shuttle is configured to transport a pallet, and the at least one shuttle is transported by the at least one parent car.

8. System according to claim 1, characterized in that the system includes 1-10 shuttles to every parent car.

9. System according to claim 1, characterized in that the at least one transfer car is a common transfer car that operates within more than one of said parallel store blocks.

10. System according to claim 1, characterized in that the several store aisles are transverse relative to the at least one transverse aisle.

11. System according to claim 1, characterized in that the at least one transverse aisle and the several store aisles include tracks, on which the at least one parent car, the at least one transfer car, and the at least one shuttle are arranged to move.

* * * * *